United States Patent [19]

Knodt

[11] Patent Number: 4,799,083

[45] Date of Patent: Jan. 17, 1989

[54] MACHINE-OPERATOR INTERFACE METHODS

[75] Inventor: Ruediger W. Knodt, Rochester, N.Y.

[73] Assignee: Xerox Corporation, Stamford, Conn.

[21] Appl. No.: 64,726

[22] Filed: Jun. 22, 1987

[51] Int. Cl.$^4$ .......................................... G03G 15/00
[52] U.S. Cl. ................................. 355/14 R; 355/3 R
[58] Field of Search .......................... 200/308–314, 200/317, 11 TW, 5 A, 159 B; 355/14 R, 14 C, 3 R; 340/709; 364/518, 521

[56] References Cited

U.S. PATENT DOCUMENTS

| | | | |
|---|---|---|---|
| 3,818,155 | 6/1974 | Lockard | 200/11 TW |
| 4,022,993 | 5/1977 | Shattuck | 200/314 X |
| 4,060,703 | 11/1977 | Everett, Jr. | 200/317 X |
| 4,218,603 | 8/1980 | Satoh | 200/312 |
| 4,300,829 | 11/1981 | Braswell et al. | 355/14 R |
| 4,310,839 | 1/1982 | Schwerdt | 340/709 X |
| 4,327,994 | 5/1982 | Barley et al. | 355/14 R |
| 4,332,464 | 6/1982 | Bartulis et al. | 355/14 C |
| 4,393,375 | 7/1983 | Sugiura et al. | 355/14 R X |
| 4,398,819 | 8/1983 | Schron | 355/14 R |
| 4,431,882 | 2/1984 | Frame | 200/5 A |
| 4,440,999 | 4/1984 | Doughty | 200/5 A |
| 4,475,806 | 10/1984 | Daughton et al. | 355/14 R |
| 4,490,587 | 12/1984 | Miller et al. | 200/5 A |
| 4,549,805 | 10/1985 | Iimori | 355/3 R X |
| 4,639,881 | 1/1987 | Zingher | 364/518 X |
| 4,653,899 | 3/1987 | Watanabe | 355/14 R |
| 4,700,025 | 10/1987 | Hatayama et al. | 200/314 X |

*Primary Examiner*—A. T. Grimley
*Assistant Examiner*—Ed Pipala
*Attorney, Agent, or Firm*—Ronald F. Chapuran

[57] ABSTRACT

The present invention is a membrane switch having first and second contacts, a graphic overlay, and a bezel combination, the graphic overlay molded to the bezel, the graphic overlay supporting a tactile actuator, the actuator being molded to the overlay and disposed in relation to the contacts for engagement of the contacts upon application of pressure to said actuator. A plasma, solid area illuminator behind an LCD display is also provided as well as a scrolling device to layer information presented to an operator.

1 Claim, 4 Drawing Sheets

MACHINE-OPERATOR INTERFACE METHODS

BACKGROUND OF THE INVENTION

This invention relates to machine-operator interfaces and in particular to mimic and interactive displays and modifications to touch sensitive control panels in reproduction machines.

The development of more complex and varied office machines has resulted in increasing problems in instructing operators in the proper operation of the machine. This has been particularly true in the evolution of office copying and printing machines where the machines have become highly sophisticated and function rich. The machines have been provided with operator interactive consoles consisting of an array of buttons, knobs, displays and indicator lights associated with various modes of operation, resulting in increased operator errors and the consequent malfunction and undesired machine operation.

Efforts have been made to improve the presentation of information to an operator by listing the number of instructions or information messages displayed at any one time and by guiding an operator through a step-by-step sequence of displayed messages prompting operator entry. For example, it has been disclosed in U.S. Pat. No. 4,327,994, commonly assigned, to provide an operating console that sequentially presents operator input instructions, prompting an operator to copy number and function selection information using the same keys of a single keyboard. As a result, the fast array of buttons typically associated with the operating console of a machine can be eliminated in favor of a simplified keyboard input device. U.S. Pat. No. 4,300,829, commonly assigned, teaches a multi-task button and cascade illumination control panel in which the successive keying of a single control button sequencies the system to alternate control modes, and at the same time an illuminating lamp indicates the particular mode selected.

It is also known in the prior art to provide a control panel divided into entry programs and display sections for interaction between the operator and the reproduction machine. The entry portion, for example, might progressively ask for job number, light or dark originals, reduction size, or duplex operation. Numerical information is then entered or a "Yes" or "No" key is activated in response. Other patents, such as commonly assigned U.S. Pat. No. 4,332,464 teaches a user interface device having a video display capable of presenting desired images to the machine operator and a touch sensitive device capable of detecting operator request by means of the operator touching the surface of the video display. A standard keyboard may also be employed when typed responses are required of the operator. The user interface device is controlled by a general purpose computer and the visual elements presented to the user on the user interface device include instructions in text and images.

It is also known in the prior art to use graphic displays or icons to illustrate a copier configuration. The graphic displays can also involve the use of selectively energizable elements to cue the user on specific portions of the copier needing attention or maintenance. Thus, in a copier incorporating a recirculating document handler, a flashing icon of such a document handler, may indicate to the user a jam in the paper circulating in the document handler. This type of cueing can be particularly effective when coupled with an alphanumeric message reinforcing the user's perception of the problem. For example, U.S. Pat. No. 4,475,806, commonly assigned, disclosed a display having two microprocessors for displaying information on a display panel, a first microprocessor responsible for energizing alphanumeric elements to either send messages to the copier user or to prompt the user to interact with the copier. A second display is a liquid crystal display wherein selectively energizable liquid crystal elements corresponding to copier components can be rendered visible under the control of a second microprocessor. An overlay pattern can be placed above the liquid crystal display to present to the user in outline form, the copier architecture in which the user is interacting.

As a further step in operator machine interfaces, touch sensitive control panels are being used more and more. The essence of such touch sensitive control panels are transparent membrane switches wherein conductive membranes are brought into engagement with one another to close a circuit to effect a particular function upon touching as disclosed in U.S. Pat. No. 4,440,999. In addition, U.S. Pat. Nos. 4,431,882 and 4,490,587 are further examples of membrane switches and switch assemblies. Generally, membrane panel overlays are produced from flat extruded film target areas that can be debossed or embossed by the application of pressure and/or heat. The difficulty with this technique is that such deformation of a flat uniform surface introduces twists, irregularities, and waviness that detract from a quality appearance. In addition, the embossed areas are relatively level and not easily distinguishable to the touch or pressure of a finger thus compromising the usual tactile feel of an engaged or touched switch. It would be desirable, therefore, to provide membrane switch actuators that are sufficiently raised to be visually and tactilely prominent, as well as rigid to the touch and transparent to an integral indicator light, while the adjacent areas are flexible.

It is common to use alphanumeric dot matrix displays in current control panels with LCD lighting technology. Generally, however, such displays are often barely noticeable by the user. Attempts to correct the problem usually includes some method of back lighting the display thus changing an essentially passive display into an active light emitting display. It would be desirable, therefore, to provide a display which fits precisely behind the LCD dot matrix display and provides an even, strong, long lasting and low current illuminator.

A difficulty with the prior art panel interfaces is that the operating instructions, feature selections, and system status information displays tend to be presented in a linear, sequential fashion resulting in long and complex control display clusters. It would be desirable to alleviate this problem by layering information components.

It is an object of the present invention, therefore, to provide new and improved techniques to simplify the operator machine interface. It is another object of the present invention to combine the molding of Bezel overlays with the flexibility of thin membrane extruded films of similar materials in order that membrane switch actuators are sufficiently raised to visually and tactilely prominent as well as rigid to the touch and transparent to an integral indicator light. It is another object of the present invention to provide a plasma solid area illuminator located precisely behind an LCD display to give a strong, long lasting low current illumination. It is still another object of the present invention to provide layered information components on a control panel by providing feature access controls positioned adjacent and surrounding a display to provide layered information to an operator in successive layers using frames on a CRT, variable dot matrix-type displays, or multi-position selector knobs, projection and scrolls. Further advantages of the present invention will become apparent as the following description proceeds and the features characterizing the invention will be pointed out with particularity in the claims annexed to and forming a part of this specification.

BRIEF SUMMARY OF THE INVENTION

Briefly, the present invention is a membrane switch having first and second contacts, a graphic overlay, and a bezel combination, the graphic overlay molded to the bezel, the graphic overlay supporting a tactile actuator, the actuator being molded to the overlay and disposed in relation to the contacts for engagement of the contacts upon application of pressure to said actuator. A plasma, solid area illuminator behind an LCD display is also provided as well as a scrolling device to layer information presented to an operator.

BRIEF DESCRIPTION OF THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1:
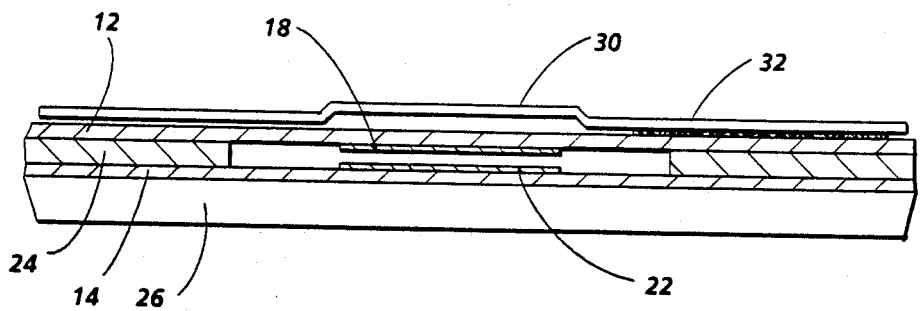
FIG. 1 illustrates a prior art membrane switch.

With reference to FIG. 1 there is illustrated a portion of a typical prior art control panel with a membrane switch. The membrane switch comprises two switch networks 12, 14 wired in parallel, the network 12 including a first laminar sheet supporting a first contact 18 and the network 14 including a second laminar sheet supporting a second contact 22. The contacts 18 and 22 are usually made of an electrically conductive and transparent material. A spacer laminar 24, having oppositely facing surfaces defining a window, is disposed intermediate the laminar sheets to provide an air gap between the contacts 18 and 22 disposed in the window when the contacts 18 and 22 are in the normally open position. A substrate 26 supports the membrane switch and in particular is secured to the second laminar.

Typically, the actuator of the membrane switch is a raised nub 30 of a graphic overlay 32 suitably secured to the first laminar by adhesive. By applying pressure to the actuator 30, the contact 18 is pressed into engagement with the contact 22 to close the circuit. Typically, the nub 30 is an embossed or raised portion of the flat extruded graphic overlay produced by the application of pressure and/or heat. These nubs or raised surfaces often contain irregularities and waviness detracting from the quality of appearance and are not raised sufficiently to produce a tactile feel upon pressing the nub 30. The entire assembly is then secured to a bezel or the frame of a control console.

Figure 2:
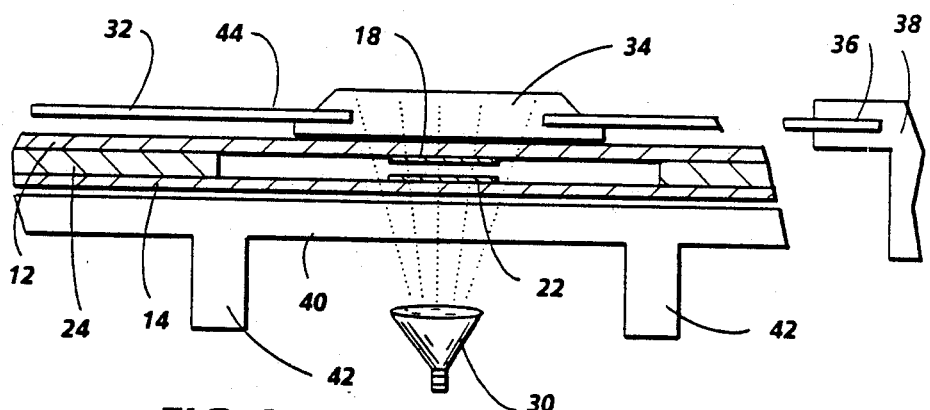
FIG. 2 is an illustration of a membrane switch in accordance with the present invention.

With reference to FIG. 2, there is also illustrated a portion of a control panel with a membrane switch. As in FIG. 1, the membrane switch comprises two switch networks 12, 14 wired in parallel, the network 12 including a first laminar sheet supporting a first contact 18 and the network 14 including a second laminar sheet supporting a second contact 22. The contacts 18 and 22 are made of an electrically conductive and transparent material. A spacer laminar 24 is disposed intermediate the laminar sheets to provide an air gap between the contacts 18 and 22 when the contacts 18 and 22 are in the normally open position.

However, in accordance with the present invention and with continued reference to FIG. 2, an actuator 34 is provided that is sufficiently raised to be visually and tactilely prominent and has good appearance. It is molded to the overlay 32. That is, preferably during the same molding operation, a plurality of actuators 34 are placed suitably in a die and molded to the same overlay. Also, during the same molding operation or in any separate molding operation, the graphic overlay 32 is molded into a suitable notch 36 of a bezel 38. Preferably, the graphic overlay 32 is a thin (0.010") extruded membrane film of a material similar to the transparent actuator 34. It should be understood that any molding process or sequence of molding operations is contemplated by the present invention to provide a integral molded actuator 34, graphic overlay 32 and bezel 38. With the actuator 34 molded to the graphic overlay 32, the adjacent areas of the overlay 32 are flexible and in a preferred embodiment, permits the 0.005–0.010" travel generally required for membrane switching to occur.

The mold insertion of the graphic overlay 32 also permits the integral design of a transparent egg crate arrangement 40 with extending partitions 42 for the transparent support of the membrane assembly. The egg crate arrangement provides for the separation of light sources 30 as well as provides a rigid outer structure permitting the mechanical fastening of components in the membrane construction. The light source 30 projects light through the contacts 18 and 22 upon activation by the actuator 34. In addition, the molded in place overlay 32 can be predecorated with visual elements on the top surface 44 of the overlay and contain printed switch elements, thus eliminating a separate switch film layer.

Figure 3A:
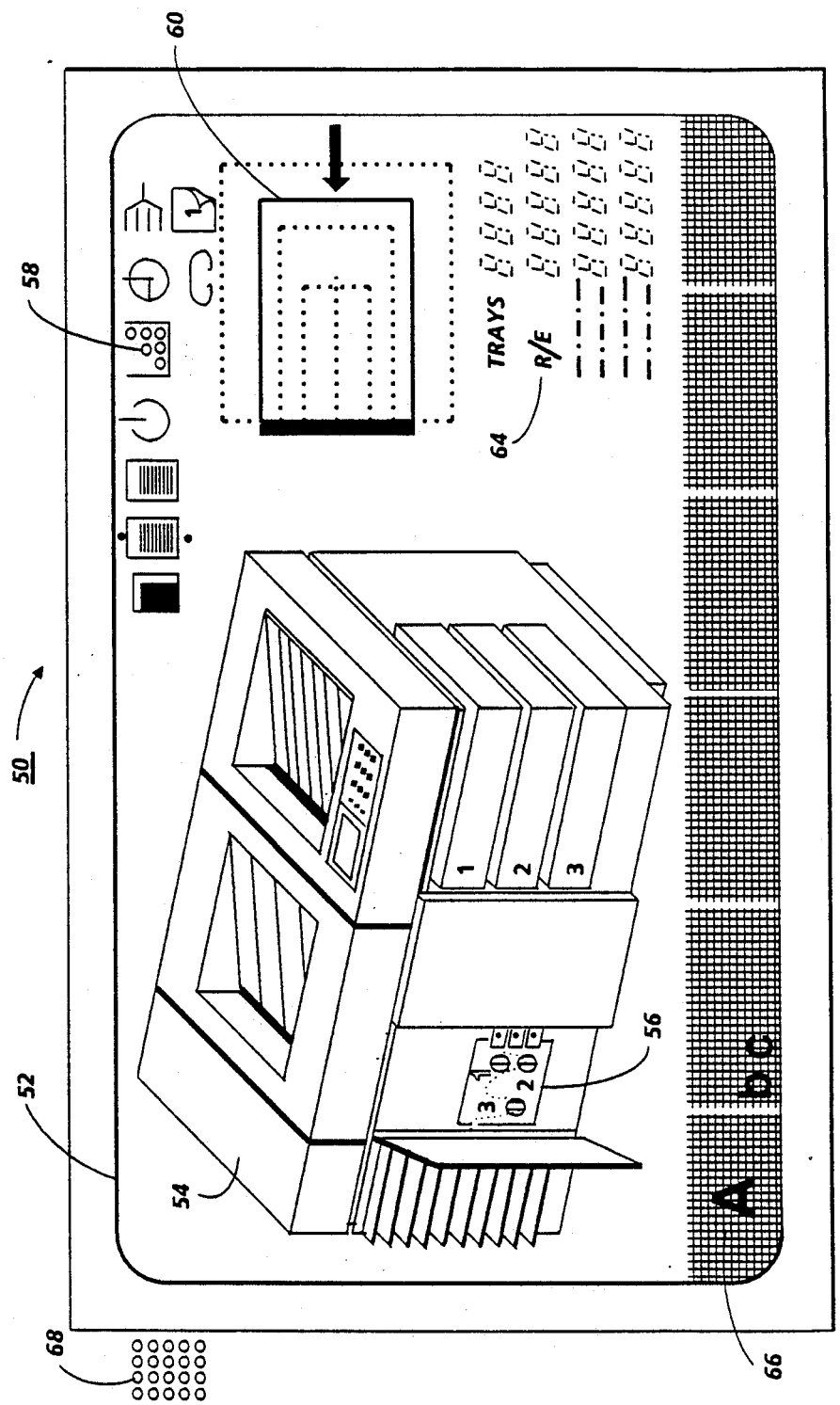
FIG. 3a and 3b illustrate control panels with feature access controls positioned surrounding the graphic display providing access to functional display areas in grid fashion in accordance with another feature of the present invention.
Figure 3B:
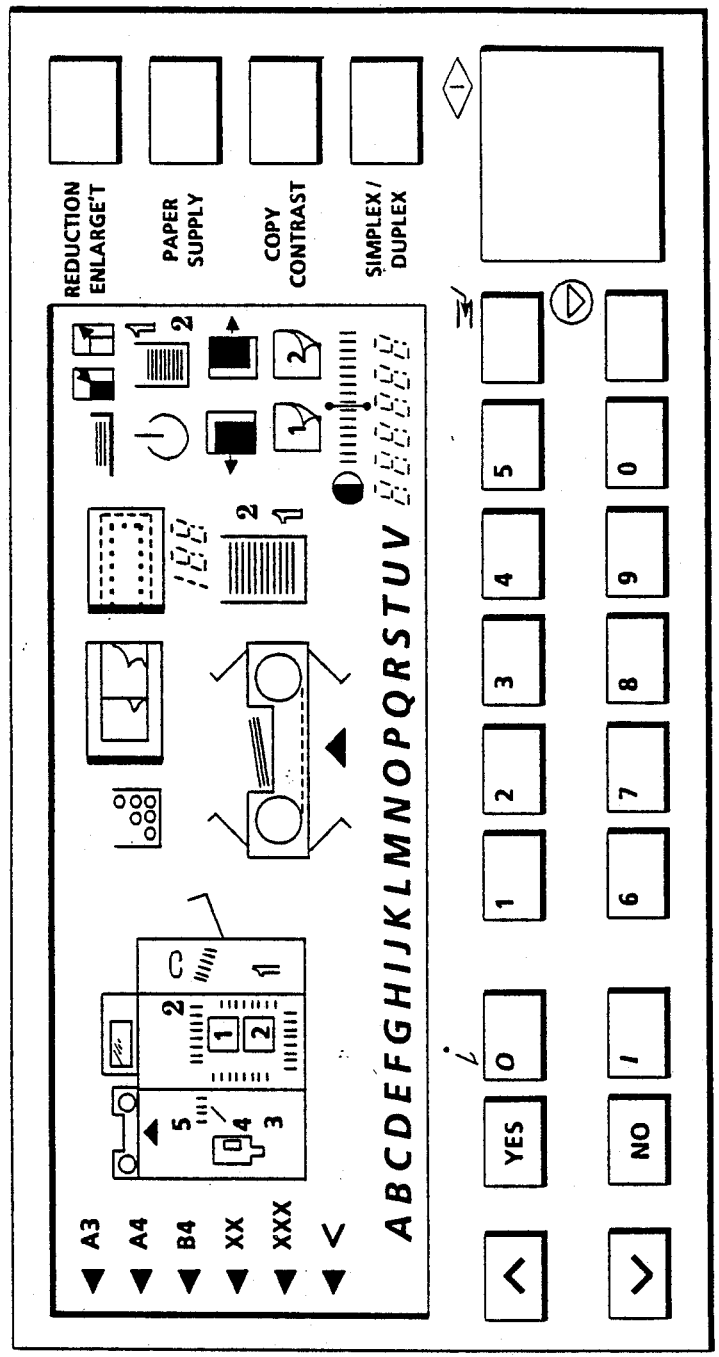

With respect to FIG. 3a, there is illustrated in general a control panel 50 having a display screen 52 segmented in grid fashion into a pictorial area 54, a mapping portion 56, an icon portion 58, an analog display portion 60 and an alpha numeric display 64 providing numeric data segments displays, Also, provided is a touch screen and display area 66 and an auditory response portion could be provided at 68. The display area could be a dc plasma display, vacuum fluorescent or liquid crystal displays or any combination thereof. As illustrated the controls are positioned adjacent and surrounding the display for providing access to specific functional display areas in a grid fashion where the feature choices reside either in graphic on or off format on in the control pixel displays. FIG. 3b is another illustration of the layout of a control panel in grid format.

Figure 4:
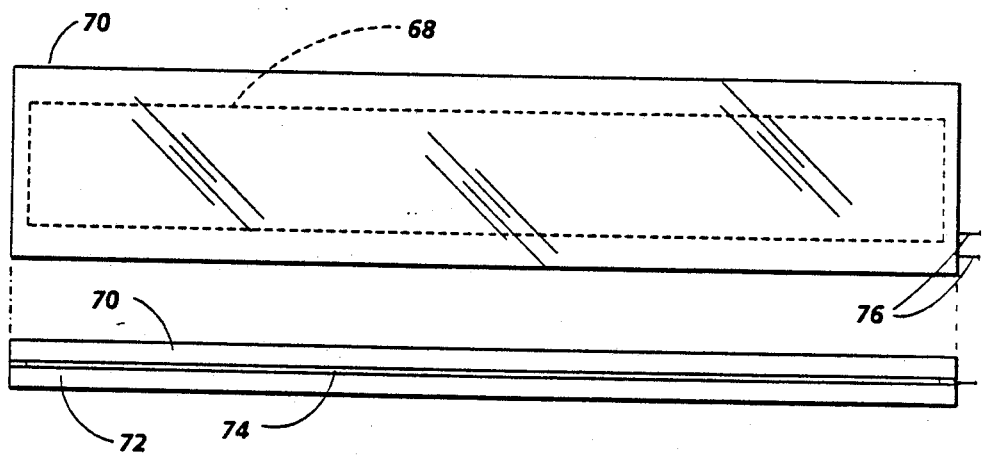
FIG. 4 is an illustration of a plasma solid area back-up display in accordance with the present invention.

With reference to FIG. 4, there is disclosed an illustration of a plasma solid area display that could be positioned directly behind a typical LCD control console display 68 in accordance with another feature of the present invention. The plasma solid area display includes two sheets of glass 70 and 72 of approximately 0.080" thick separated by 0.02" spacer 74. The plasma solid area displays provide an even, strong (100 foot lamberts) cool and long lasting, low current illumination. It is possible to segment the plasma solid area display to illuminate only specific segments. In a preferred embodiment, the spectrum would be a white or blush color. The leads 76 are connected to a suitable driver subassembly.

Figure 5A:
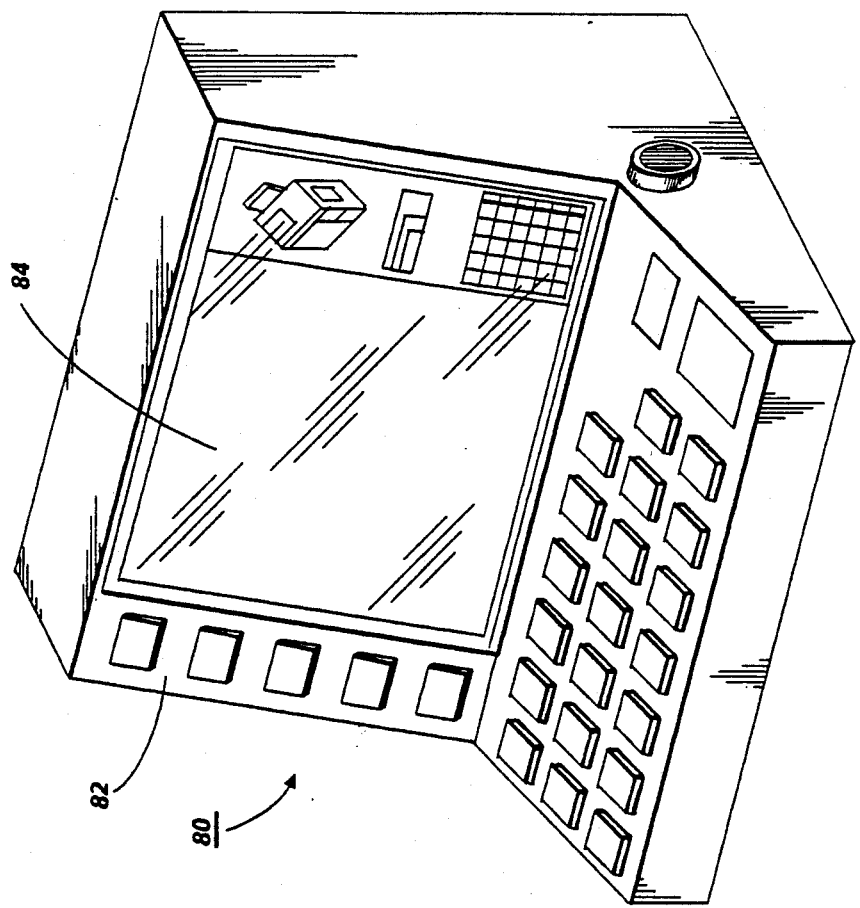
FIGS. 5a and 5b are an illustration of a display panel and scrolling means in accordance with another feature of the present invention.
Figure 5B:
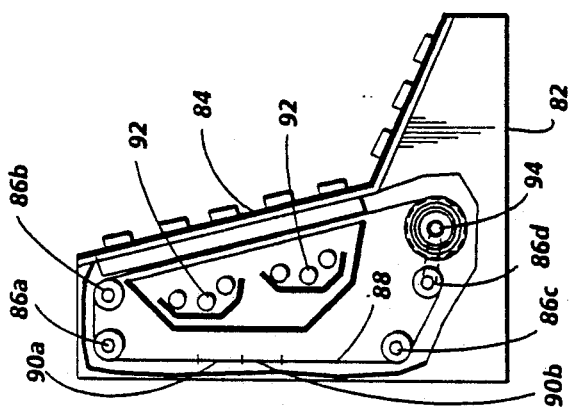

With reference to FIG. 5a and 5b, there is disclosed a control panel generally shown at 80 including a housing 82 supporting a display 84 and a plurality of rolls 86a, b, c and d having a scroll 88 entrained thereon. The scroll includes a plurality of segmented sections such as illustrated at 90a and 90b, with each of the sections providing control information. Illuminating means 92 disposed within the housing are positioned to project light toward the display area 84. A scrolling means 94 either manually or automatically activated sequentially positions each of the segmented sections of the display area to progressively and selectively prompt the operator and machine operation. Alternatively, one of the rolls, 86d, is a take-up roll to allow an expanded base for control information.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. In a reproduction machine, a control panel having a display area for displaying information for operating the machine comprising:

a housing supporting the control panel, a plurality of rolls, the rolls being secured to the housing for rotating therein, a scroll, the scroll being entrained about the rolls and having a plurality of segmented sections, each of the sections providing machine control information, illuminating means disposed within the housing, the illuminating means being positioned to project light toward the display area, a portion of the scroll being disposed intermediate the illuminating means and the display area, scrolling means connected to scroll to sequentially position each of the segmented sections in the display area to progressively and selectively prompt the operator in machine operation and a take-up roll, said take-up roll cooperating with said plurality of rolls to expand the number of said segmented sections.

* * * * *